US012254856B1

(12) United States Patent
Simmons et al.

(10) Patent No.: US 12,254,856 B1
(45) Date of Patent: Mar. 18, 2025

(54) ELECTRONIC HI-HAT CYMBAL

(71) Applicant: Guitar Center, Inc., Westlake Village, CA (US)

(72) Inventors: David Simmons, Suffolk (GB); Jeffrey R. Laity, Pasadena, CA (US)

(73) Assignee: Guitar Center, Inc., Westlake Village, CA (US)

( * ) Notice: Subject to any disclaimer, the term of this patent is extended or adjusted under 35 U.S.C. 154(b) by 0 days.

(21) Appl. No.: 18/887,796

(22) Filed: Sep. 17, 2024

Related U.S. Application Data

(60) Provisional application No. 63/563,633, filed on Mar. 11, 2024.

(51) Int. Cl.
*G10H 3/26* (2006.01)

(52) U.S. Cl.
CPC ......... *G10H 3/26* (2013.01); *G10H 2230/331* (2013.01)

(58) Field of Classification Search
CPC ........................... G10H 3/26; G10H 2230/331
See application file for complete search history.

(56) References Cited

U.S. PATENT DOCUMENTS 7,459,626 B2 12/2008 Yoshino et al.
7,468,483 B2 12/2008 Yoshino
7,589,275 B2 * 9/2009 Arimoto ................ G10H 7/008 84/723
7,943,841 B2 5/2011 Toda
8,410,348 B1 4/2013 Hsieh
8,742,244 B2 6/2014 Wissmuller
2005/0039593 A1 * 2/2005 Wachter ................ G10H 3/146 84/730
2005/0145101 A1 * 7/2005 Yoshino .................. G10H 1/32 84/723
2022/0319475 A1 10/2022 Morita
2024/0144898 A1 * 5/2024 Recchia .................. G10H 1/34
2024/0144903 A1 5/2024 Recchia

* cited by examiner

*Primary Examiner* — Jeffrey Donels
(74) *Attorney, Agent, or Firm* — SoCal IP Law Group LLP; Guy L. Cumberbatch; Steven C. Sereboff

(57) ABSTRACT

There is disclosed an electronic hi-hat system having a movable upper housing separated from a stationary lower housing by a spring, with the upper housing having a simulated cymbal attached thereto. The upper housing and simulated cymbal connect through a central vertical rod to a lower foot pedal, with the entire structure being supported by a stand on which the lower housing mounts. The lower housing has a Hall effect sensor mounted thereon, and the upper housing has a permanent magnet aligned with and arranged to reciprocate vertically alongside the Hall effect sensor. The position of the magnet on the movable upper housing, and thus the simulated cymbal, is detected by Hall effect sensor which generates signals that can be transmitted, processed, and amplified into simulated high-hat cymbal sounds.

23 Claims, 15 Drawing Sheets

ELECTRONIC HI-HAT CYMBAL

RELATED APPLICATION INFORMATION

This application claims priority under 35 U.S.C § 119 (e) to provisional application No. 63/563,633, filed on Mar. 11, 2024.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to electronic hi-hat cymbals.

Description of the Related Art

Since the 1920s, a traditional acoustic drum set typically has a pair of metal (e.g., bronze) cymbals collectively called the hi hat. These two cymbals are suspended on a hi hat stand facing in a concave mirror image from each other. The bottom cymbal of a hi hat stays stationary, while the top cymbal can be moved up and down using a foot pedal. Modulating the force and timing of the step changes the impact of the two cymbals and thus the sound generated. Depending on how hard a hi-hat is struck and whether it is "open" (i.e., pedal not pressed, so the two cymbals are not closed together), a hi-hat can produce a range of dynamics, from very quiet "chck" sounds, done with merely gently pressing the pedal to very loud crashes (e.g., striking fully open hats hard with sticks).

Electronic hi-hat cymbals are sold which don't rely on contact between acoustic bronze cymbals. A 2-piece electronic hi-hat consists of two separate components—the top cymbal and the bottom cymbal-often both equipped with sensors. These sensors detect the drummer's movements and translate them into electronic signals, which are then transduced and amplified, producing a realistic and dynamic sound.

Despite numerous examples, the electronic hi-hat devices in the art and on the market fall short in terms of quality of sounds produced.

SUMMARY OF THE INVENTION

The electronic hi-hat system disclosed herein is an assembly of two relatively moving parts coupled with electronics. A movable upper housing is separated from a stationary lower housing by a spring, with the upper housing having a simulated cymbal attached thereto. The upper housing and simulated cymbal are connected through a central vertical rod to a lower foot pedal, with the entire structure being supported by a stand on which the lower housing mounts. The lower housing has a Hall effect sensor mounted thereon, and the upper housing has a permanent magnet aligned with and arranged to reciprocate vertically alongside the Hall effect sensor. The mounting positions of the magnet and Hall effect sensor may be reversed, though the sensor comprises a circuit board which is easier to connect to associated electronics on the stationary housing. The position of the magnet on the movable upper housing, and thus the simulated cymbal, is detected by Hall effect sensor which generates signals that can be transmitted, processed, and amplified into simulated high-hat cymbal sounds.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Figure 1:
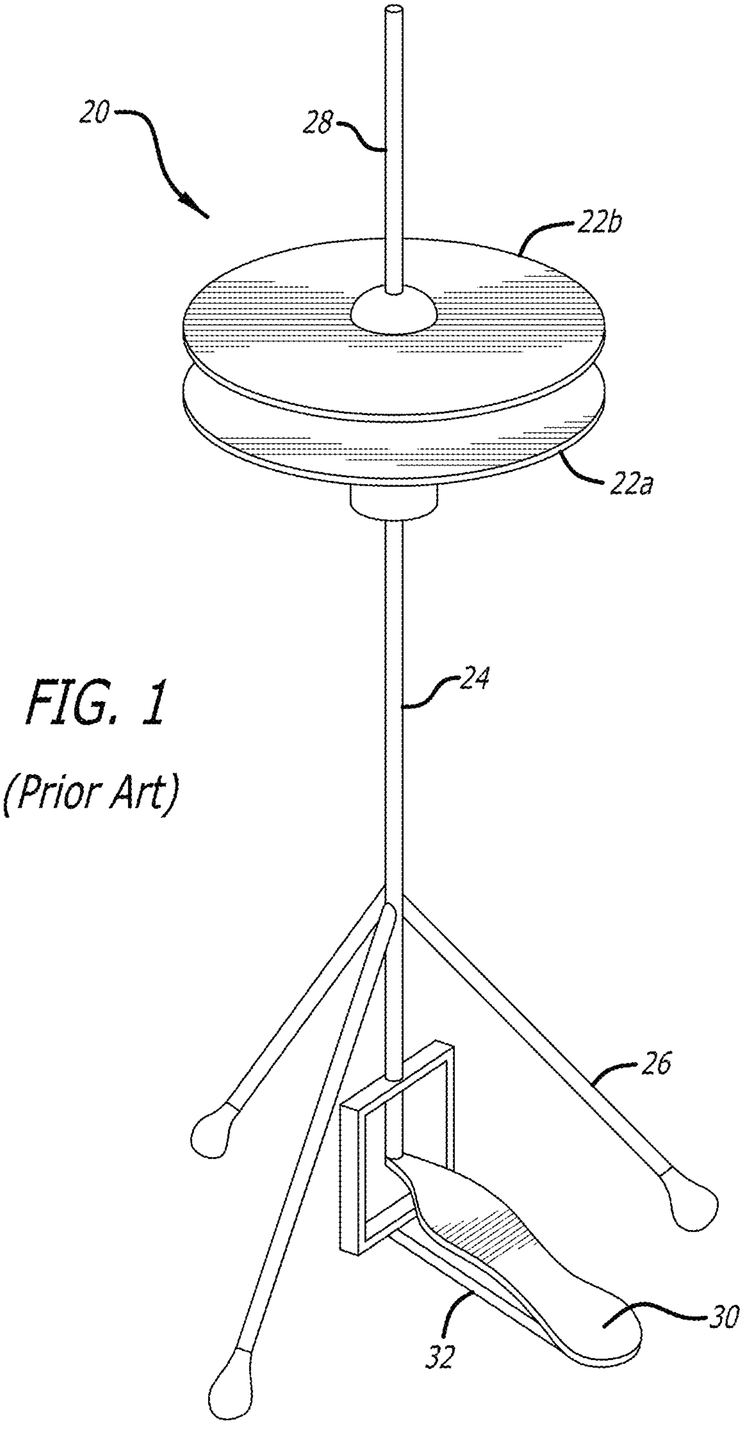
FIG. 1 (Prior Art)
FIG. 1 is a perspective view of a conventional pedal-operated hi-hat cymbal.

FIG. 1 is a perspective view of a conventional pedal-operated hi-hat cymbal assembly 20. The hi-hat cymbal assembly 20 includes a pair of metallic, typically bronze, cymbals 22*a*, 22*b* mounted near the top of a vertical stand 24 supported by lower legs 26. While the lower cymbal 22*a* is fixed with respect to the stationary stand 24, the upper cymbal 22*b* is fixed with respect to a movable rod 28 that slides within the hollow stand 24. The rod 28 extends downward through the stand 24 and connects at its lower end to the front end of a foot pedal 30 whose rear end is mounted to pivot about a floor bracket 32. The foot pedal 30 incorporates a spring mechanism (not shown) which biases its front end upward so that a drummer need only push downward on the foot pedal to cause the cymbals 22*a*, 22*b* to come together and make an acoustic noise. The foot pedal 30 automatically returns to its raised position when the drummer's foot lifts up. As mentioned above, the velocity and force applied to the foot pedal 30 can be varied to modulate the acoustic sound.

Figure 2:
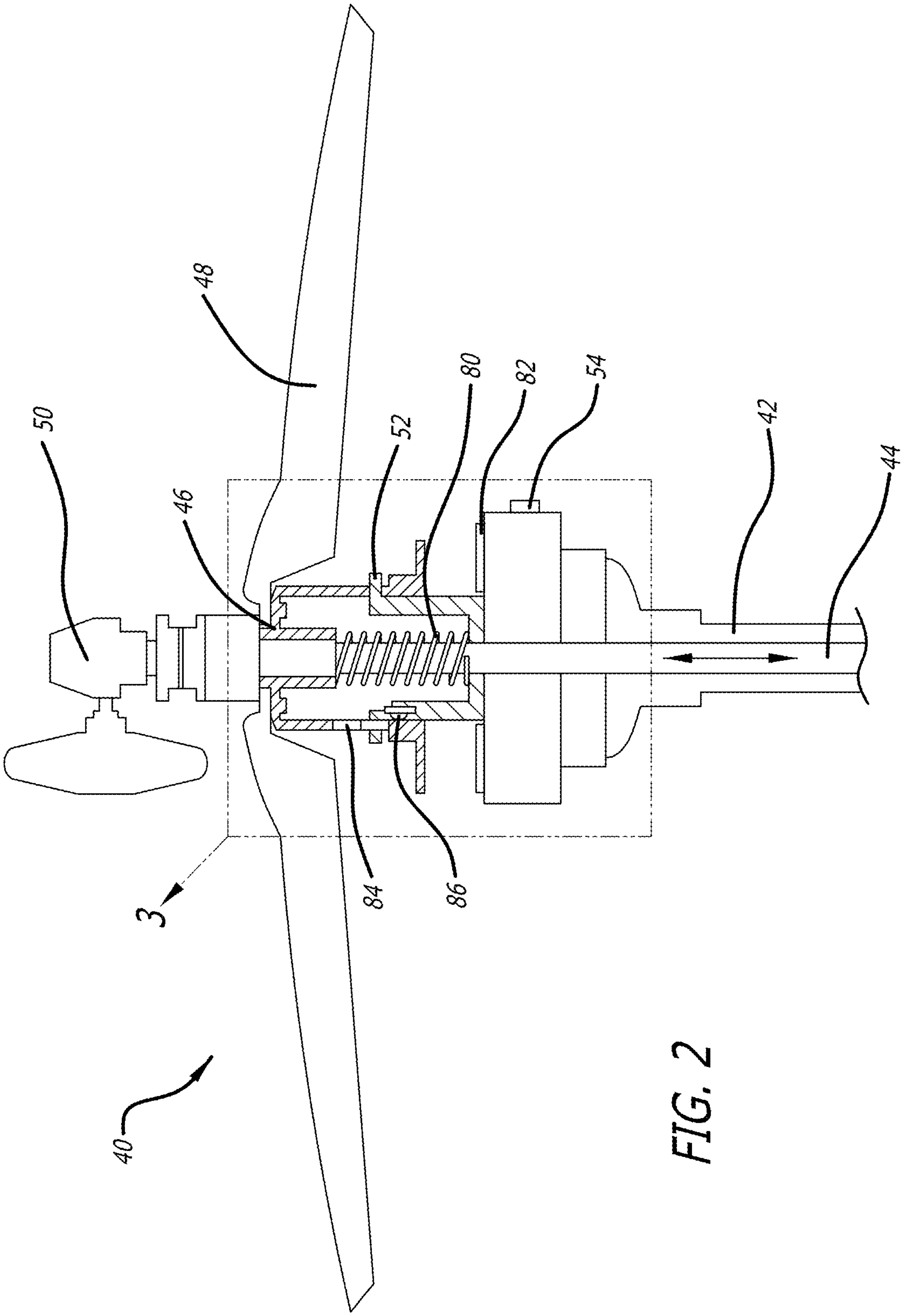
FIG. 2 is a vertical sectional view through an electronic hi-hat cymbal assembly of the present application.

FIG. 2 is a vertical sectional view through an electronic hi-hat cymbal assembly 40 of the present application. Although not shown completely, the hi-hat cymbal assembly 40 is mounted at the top of a stationary vertical stand 42 supported on the floor with legs, for example. The stand 42 is hollow and a rod 44 is arranged to move up and down within an inner throughbore. The rod 44 connects to a lower foot pedal, such as the ones shown in FIG. 1, to actuate the hi-hat cymbal assembly 40.

The rod 44 extends upward beyond the top of the stand 42 and is fixed to an upper housing 46 to which an upper cymbal 48 mounts. The cymbal 48 is a simulated cymbal as it does not actually strike a lower cymbal to make an acoustic sound. Indeed, in this embodiment there is no lower cymbal as the sound produced does not depend on the acoustic sound generated by the impact between two physical cymbals. Typically, the cymbal 48 is made of a polymer, though any lightweight material may be utilized. Alternatively, bronze or other metallic materials may be used, with the simulated cymbal being a solid disk, perforated, or generally formed from any rigid materials and with any configuration available on the market. The simulated cymbal just does not need to strike a paired cymbal to make sounds.

An upper nut 50 may be fastened to a top end of the rod 44 to hold the cymbal 48 against the upper housing 46. The upper housing 46 moves up and down with the rod 44 relative to a lower housing 52, carrying the cymbal 48 with it. The lower housing 52, in turn, is fixed with respect to a bulkhead 54 mounted to the top of the stationary stand 42. The upper housing 46 and cymbal 48 thus move up and down with respect to the bulkhead 54 on which the lower housing 52 is mounted.

Figure 5:
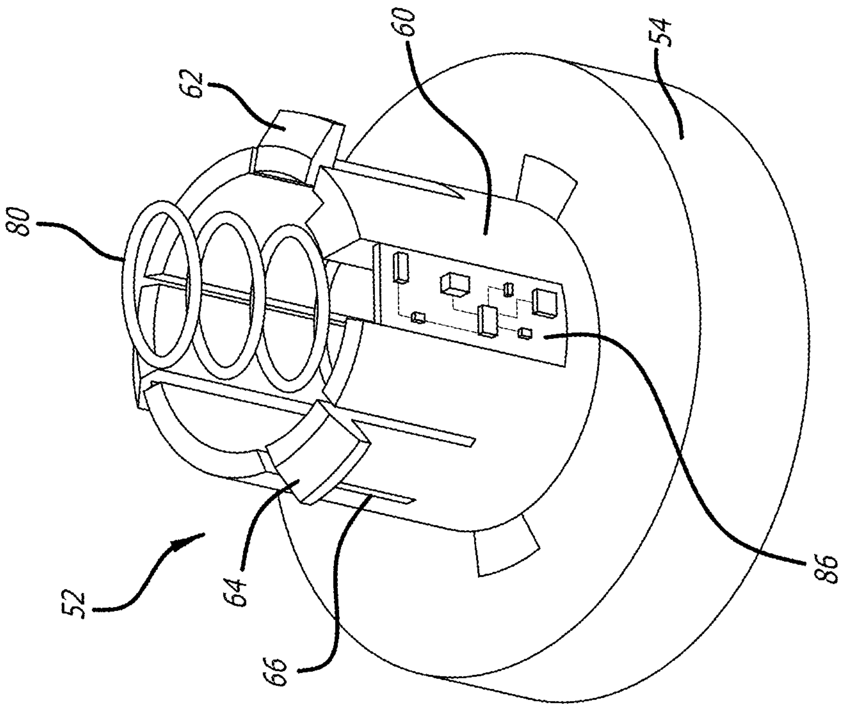
FIG. 5 is a perspective view of a stationary housing of the transducer assembly having a Hall effect sensor thereon.
Figure 4:
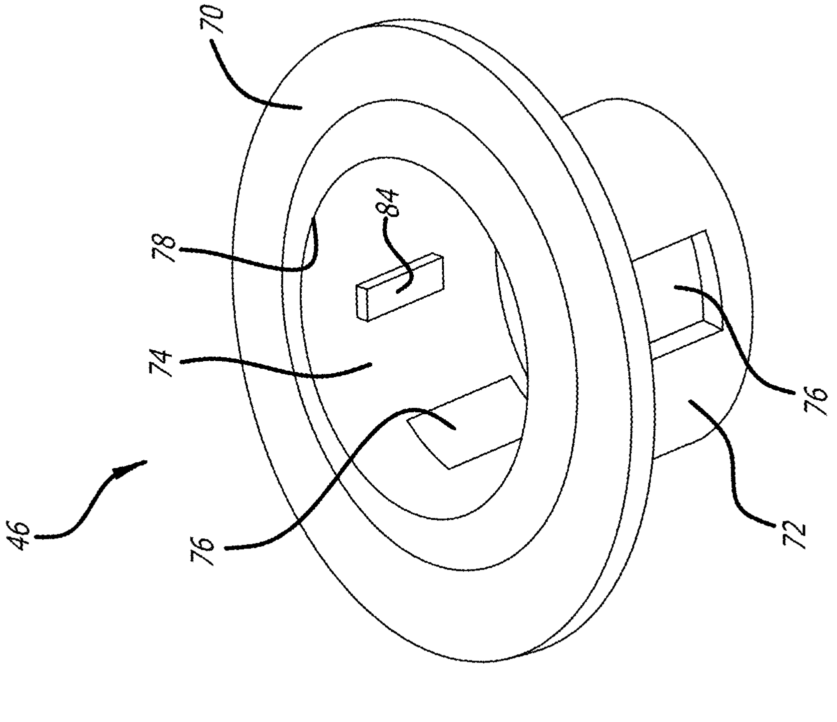
FIG. 4 is a perspective view of a movable element of a transducer assembly within the electronic hi-hat cymbal assembly of FIG. 2 carrying a magnet.

The upper housing 46 and the lower housing 52 formed the main components in a transducer assembly of the hi-hat cymbal assembly 40, and are shown in perspective in FIGS. 4 and 5. The stationary lower housing 52 has a generally tubular main body 60 with three tabs 62 extending outward from an upper edge thereof. The bulkhead 54 widens outward from a lower end of the tubular main body 60. Each of the tabs 62 has an outer ramp surface 64 and is mounted in a cantilevered fashion due to vertical slits 66 formed in the tubular main body 60. The upper housing 46 is shown inverted in FIG. 4 to illustrate a horizontal flange 70 extending outward from a lower end of a generally tubular cup 72 and surrounding a cylindrical inner cavity 74 within the main body. The main body includes three vertical slots 76 extending longitudinally along a majority of its length.

The inner cavity 74 of the upper housing 46 is configured to fit downward over the tubular main body 60 of the lower housing 52 and be retained thereon. More particularly, the cavity 74 closely surrounds the tubular main body 60 of the lower housing 52, and as the upper housing 46 is pressed downward onto the main body of the lower housing 52 a lower circular rim 78 around the inner cavity 74 contacts the outer ramp surfaces 64 of each of the tabs 62. Downward movement of the upper housing 46 cams the cantilevered tabs 62 inward to permit the upper housing to descend down around the lower housing main body 60. At some point, the three tabs 62 flex back outward into the vertical slots 76 in the tubular cup 72 of the upper housing 46. In this way, the upper housing 46 is captured by the lower housing 52, but may move up and down by virtue of the tabs 62 within the elongated slots 76. This arrangement also prevents relative rotational movement of the upper housing 46 on the lower housing 52. The movable upper housing 46 has a down position limited by the stationary lower housing 52. More particularly, the horizontal flange 70 come into contact with the wider bulkhead 54 which stops further downward movement of the upper housing 46 and cymbal 48 mounted thereon.

With reference back to FIG. 2, a coil spring 80 is mounted around the rod 44 between the movable upper housing 46 and the stationary lower housing 52 to bias the upper housing upward. A soft washer or buffer 82 made of a compressive material such as rubber is desirably placed on the bulkhead 54 to cushion the impact of the upper housing 46 when it displaces downward relative to the lower housing 52 with force. The buffer 82 may be annular and extend evenly around and between the bottom face of the flange 70 and the top face of the bulkhead 54. Alternatively, a series of buffers 82 may be distributed between the two impacting surfaces.

FIG. 2 also shows a magnet 84 carried by the upper housing 46. The magnet 84 mounts to the inside of the tubular cup 72 of the upper housing 46 so as to be exposed within the cavity 74, as seen in FIG. 4. The magnet 84 is aligned with and translates up and down relative to and alongside a Hall effect sensor 86 mounted to the tubular main body 60 of the lower housing 52, seen in FIG. 5. Due to the concentrically nature of the tubular main body 60 and tubular cup 72, the magnet 84 lies radially outside the sensor 86 and translates alongside it with a gap permitting sliding movement of 1 mm or less. The vertical travel of the rod 44 and movable upper housing 46 may be about 18 mm which corresponds to the vertical dimension of the sensor 86, with the magnet 84 remaining adjacent to the sensor to prevent magnetic decoupling.

The Hall effect sensor 86 comprises a circuit board and may be obtained off-the-shelf from various vendors, such as a DRV5056 Unipolar Ratiometric Linear Hall Effect Sensor from Texas Instruments, of Dallas, TX. The DRV5056 Hall effect sensor has a detection range is in the region of 18 mm. As the magnet 84 translates alongside the Hall effect sensor 86, the sensor generates varying electronic signals. By calibrating these electronic signals and converting them using a processor and an amplifier (not shown), distinctive desirable hi-hat sounds can be produced. The mounting positions of the magnet 84 and Hall effect sensor 86 may be reversed, though the sensor comprises a circuit board which is easier to connect to associated electronics if mounted on the stationary housing.

Figure 3A:
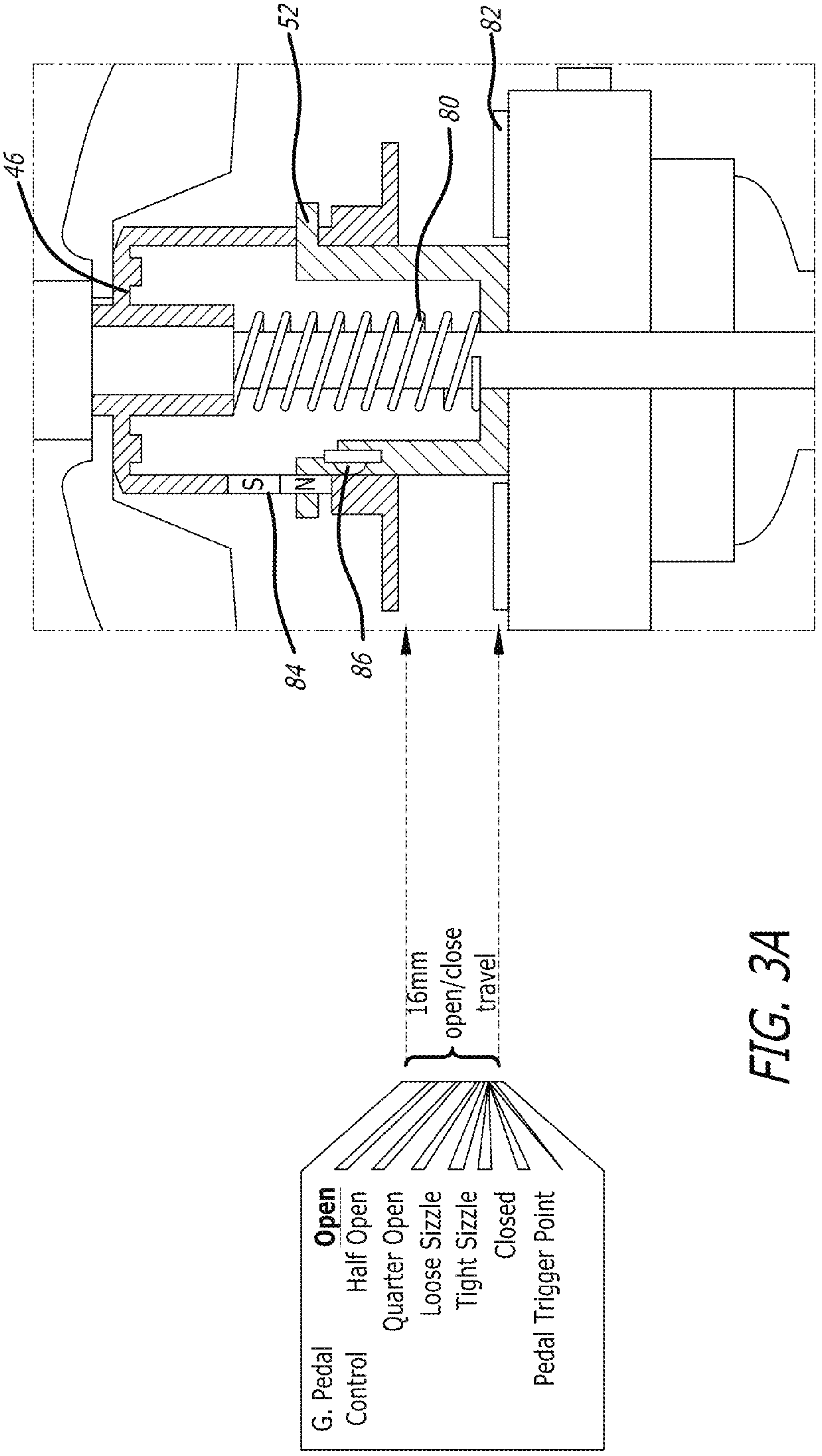
FIGS. 3A and 3B are enlargements of the sectional view in FIG. 2 showing two different operating positions.
Figure 3B:
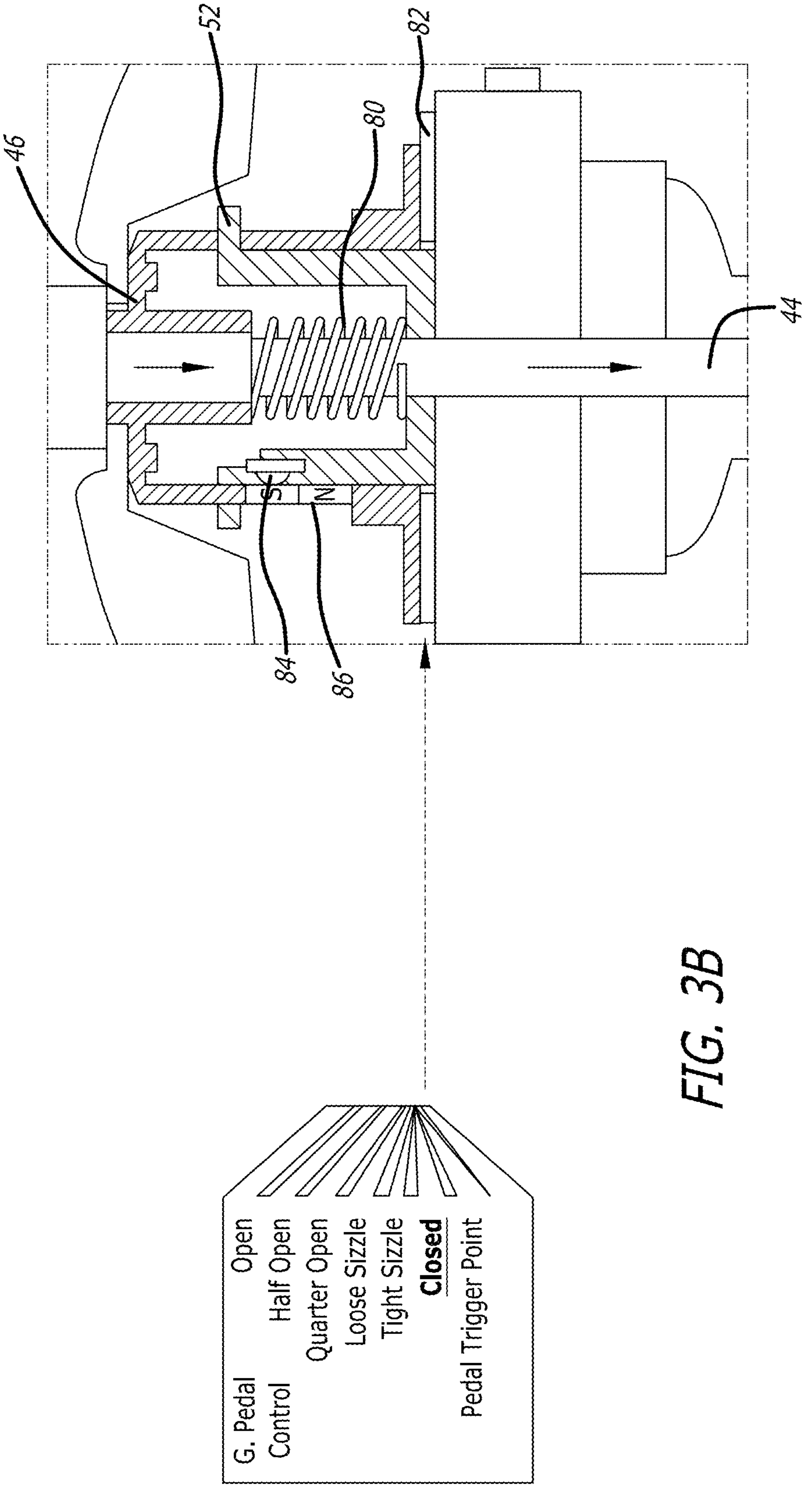

FIGS. 3A and 3B are enlargements of the sectional view in FIG. 2 showing two different operating positions and the relative positioning between the magnet 84 and the Hall effect sensor 86. The magnet 84 is arranged to have two vertically separated poles—indicated with S for South and N for North. FIG. 3B shows a lower end of the movable upper housing 46 as it contacts the soft buffer 82 on the bulkhead 54 of the stationary lower housing 52, which is the "closed" position as indicated by the schematic position list to the left. As with acoustic cymbals coming together, the particular sounds are generated when and how the movable housing 46 contacts the stationary housing 52, which is felt by the drummer's foot on the pedal. Of course, the distance the movable housing 46 is raised and its velocity in striking the stationary housing 52 are also factors in the sound produced, all of which are determined by movement of the magnet 84 as detected by the Hall effect sensor 86.

Figure 6B:
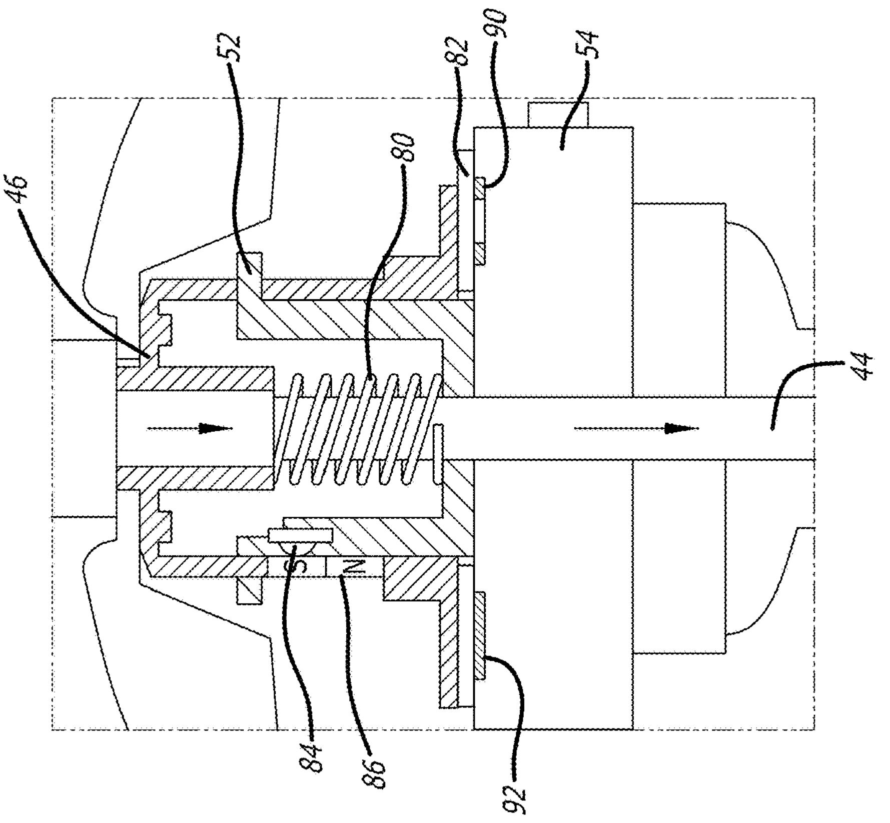
FIG. 6B is a sectional view through an electronic hi-hat cymbal assembly showing exemplary locations of the supplemental sensors.
Figure 6A:
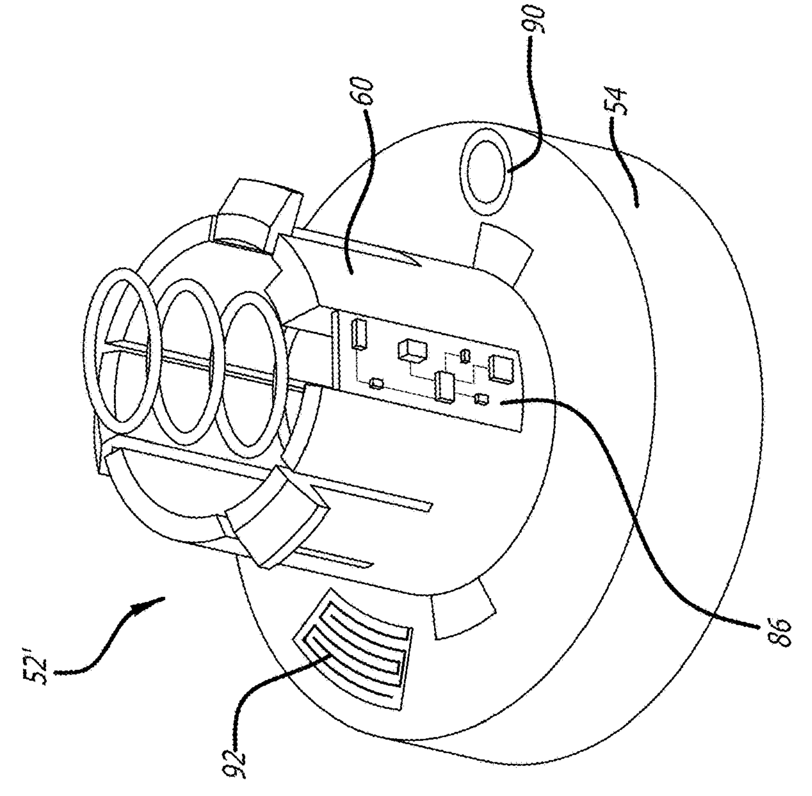
FIG. 6A is a perspective view of an alternative stationary housing of the transducer assembly having a Hall effect sensor and supplemental sensors.

FIG. 6A is a perspective view of an alternative stationary housing 52' of the transducer assembly having both a Hall effect sensor 86 and a pair of supplemental sensors 90, 92, and FIG. 6B is a sectional view through an electronic hi-hat cymbal assembly showing exemplary locations of the supplemental sensors. The supplemental sensors 90, 92 provide alternative/additional methods of control of the sound output of any of the hi-hat cymbal assemblies described herein. Added sensors may be utilized to match the "mechanical feel" of the hi-hat cymbal to the sensor output, and may be useful to sense the exact point where the closed pedal hits the closed stop.

In one example, a piezo-electric sensor 90 is added to the stationary housing 52' or anvil of the assembly. The piezo-electric sensor 90 may comprise an annular disk-shaped element with a flexible central portion supported around the perimeter. The central flexible portion, or diaphragm, is bent slightly when the movable housing 46 descends and slams into the rubber buffer 82 provided for cushioning. The central portion of the piezo-electric sensor 90 may be only 1 mm thick and needs to flex only a fraction of a millimeter to output a change in voltage. This small voltage change can then be read by the associated electronics to give an indication of exactly when and at what velocity the pedal was closed. Consequently, the piezo-electric sensor 90 provides a highly reliable and accurate signal defining when the pedal hits the "closed" position, and how fast or hard the pedal is closed.

Likewise, a force sensing resistor (FSR) sensor 92 may be added to the stationary housing 52'. The FSR sensor 92 is similar to the piezo-electric sensor 90 in that it senses small changes in pressure. A typical FSR sensor 92 consists of two small mylar sheets, one of which has silver interdigits printed on it and the other a resistive ink. When the resistive ink presses against the interdigits, a circuit is formed, and the resistance of the circuit varies according to the pressure. Consequently, as the pedal of the hi-hat assembly is pressed down, a voltage is derived by the FSR sensor 92 that is proportional to the pressure. The voltage generated by the FSR sensor 92 is an accurate point at which the pedal is closed, but also provides a wide controller signal for any "after pressure" exerted on the pedal. That is, there may not be enough range in the output of the Hall effect sensor 86 after the pedal is closed to get a desired signal for the aftertouch sound. The FSR sensor 92 gets squeezed after the pedal is fully closed and provides additional control for this aftertouch sound.

As seen in the cross-section section of FIG. 6B, either or both of the piezo-electric sensor 90 and FSR sensor 92 may be fitted in shallow wells on the top surface of the bulkhead 54. Pressure to the sensors is thus transmitted through the rubber buffers 82 from the downwardly moving housing 46. Both sensors 90, 92 are connected via wires (not shown) to the sound control system. Satisfactory performance of the electronic hi-hat cymbals described herein may be attained with just the Hall effect sensor 86, but more accuracy and expression, so-called "pro-level performance," may be attained with the addition of one or both of the sensors 90, 92. That is, the Hall effect sensor 86 works by software predicting the position of the moving housing 46 through a changing magnetic field, and adding the sensors 90, 92 which respond to physical feedback provides additional accuracy.

Figure 7:
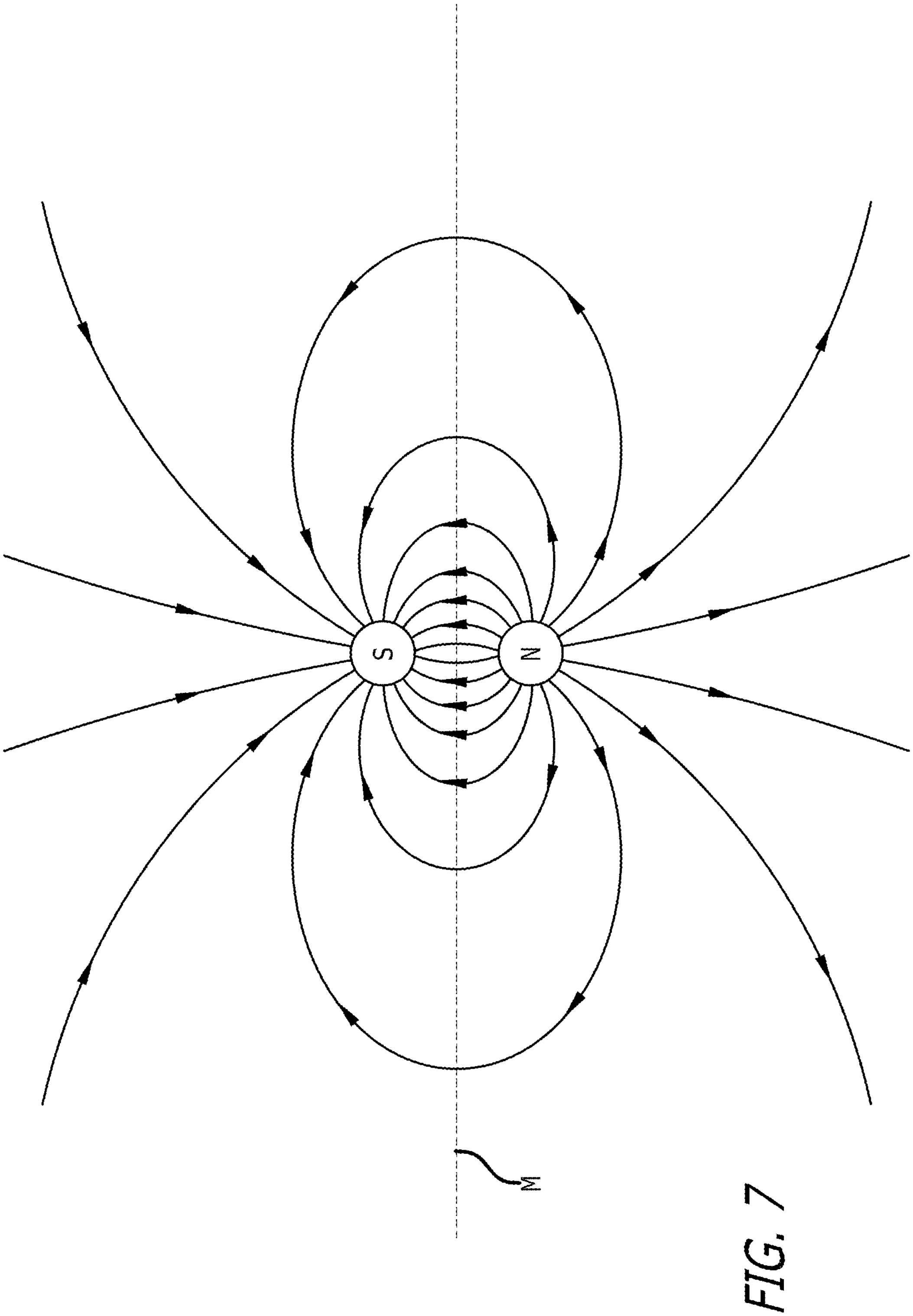
FIG. 7 schematically illustrates a toroidal magnetic field generated by two poles of a permanent magnet.

As is well known in the art, and schematically illustrated in FIG. 7, the two poles of the magnet 84 generate a toroidal magnetic field having a horizontal midplane M coinciding with the junction of the two poles. That is, the magnetic field a magnetic dipole moment, or strength, points in the direction of lines between the South and North poles of the magnet. Relative to the Hall effect sensor 86, the direction of the magnetic field switches at the horizontal midplane M between the two poles, which transition can be sensed by the sensor. Moreover, the Hall effect sensor 86 is calibrated to sense the strength of the magnetic field proportional to the distance from the midplane M between the two poles, as well as the velocity and acceleration of the relative movement between the sensor and the magnet and output a voltage proportional to this movement The resulting signal generated by the Hall effect sensor 86 is then processed using specialized software and converted into electric signals which can be amplified through speakers for the different hi hat sounds. Of course, the relative vertical position of the poles (South up or down) is reversible.

Additionally, though not shown, piezo sensor and position switches may be incorporated into the playing surface as per current designs. The number of position switches varies, and could be as few as two (bell and edge) and as many as 5 (bell, hi bow, med bow, low bow & edge).

Figure 8:
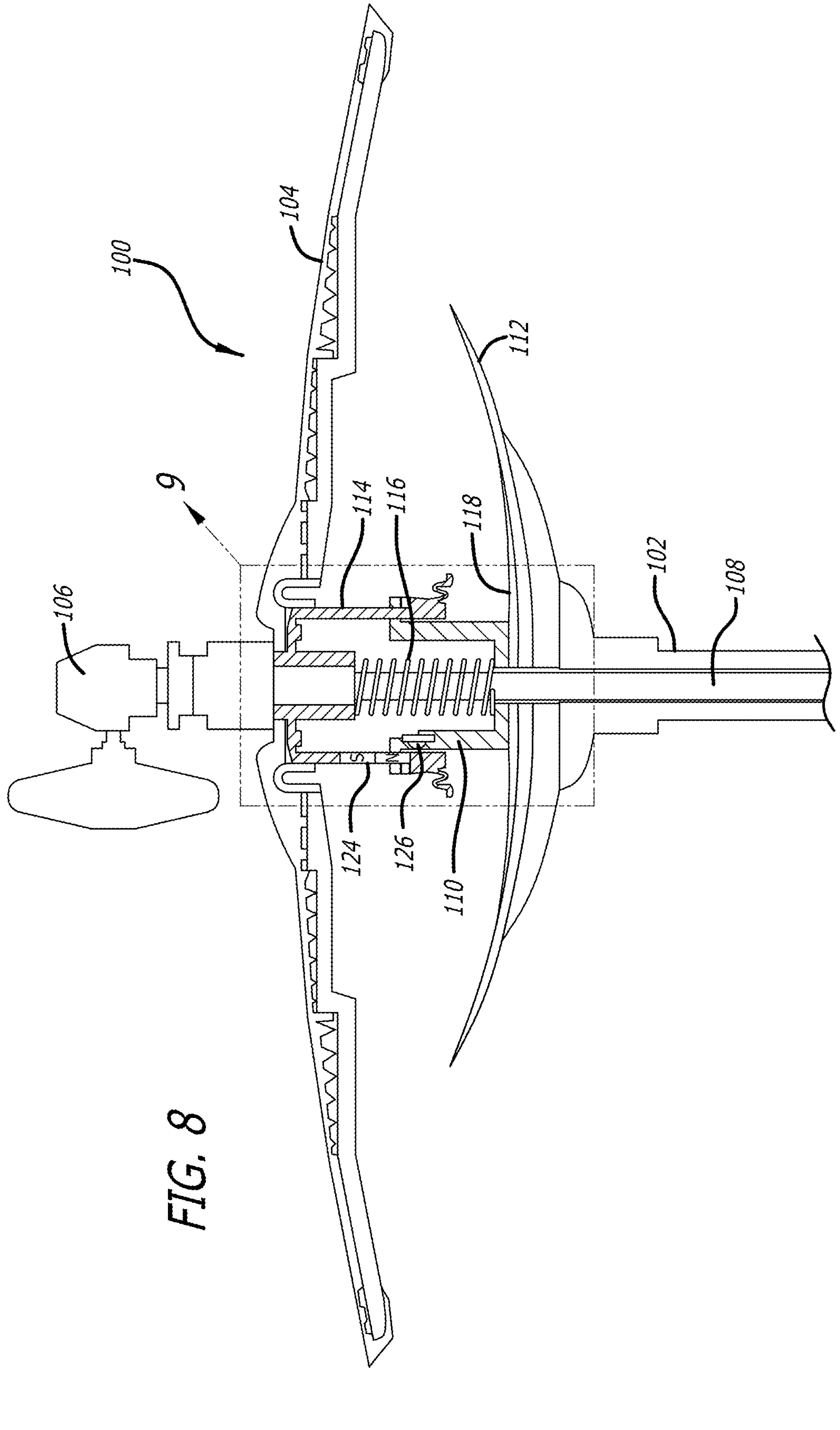
FIG. 8 is a vertical sectional view through an electronic hi-hat cymbal assembly of the present application having a simulated lower cymbal.

FIG. 8 is a vertical sectional view through an electronic hi-hat cymbal assembly 80 of the present application having a simulated lower cymbal. Although not shown completely, the hi-hat cymbal assembly 100 is mounted at the top of a stationary vertical stand 102 supported on the floor with legs, for example. The stand 102 is hollow and a rod 108 is arranged to move up and down within an inner throughbore. The rod 108 connects to a lower foot pedal, such as the ones shown in FIG. 1, to actuate the hi-hat cymbal assembly 100.

The rod 108 extends upward beyond the top of the stand 102 and is fixed to an upper housing 114 to which an upper cymbal 104 mounts. The cymbal 104 is a simulated cymbal as it does not strike a lower cymbal to make sound. Typically, the cymbal 104 is made of a polymer, though any lightweight material may be utilized. An upper nut 106 may be fastened to a top end of the rod 108 to hold the cymbal 104 against the upper housing 114. The upper housing 114 moves up and down with the rod 108 relative to a lower housing 110, carrying the cymbal 104 with it. The lower housing 110, in turn, is fixed with respect to a simulated lower cymbal 112 mounted to the top of the stationary stand 102. A coil spring 116 is mounted around the rod 108 between the movable upper housing 114 and the stationary lower housing 110 to bias the upper housing upward. The upper housing 114 and cymbal 104 thus move up and down with respect to the lower housing 110 and simulated cymbal 112, simulating an acoustic cymbal assembly such as in FIG. 1. FIG. 8 shows a stationary rubber cushion or buffer 118 placed on a top face of the lower cymbal 112 whose purpose is described below.

FIG. 8 also shows a magnet 124 carried by the upper housing 114. The magnet 124 to a main body of the upper housing 114 so as to be exposed within an inner cavity of the housing 114, much as with the earlier embodiment of FIG. 2. The magnet 124 is aligned with and translates up and down relative to a Hall effect sensor 126 mounted to the lower housing 110, seen enlarged in FIG. 9A. The Hall effect sensor 126 comprises a circuit board and may be obtained of off-the-shelf from various vendors, as mentioned above. As the magnet 124 translates alongside the Hall effect sensor 126, the sensor generates varying electronic signals. By calibrating these electronic signals and converting them using a processor and an amplifier (not shown), distinctive desirable hi-hat sounds can be produced.

Figure 9A:
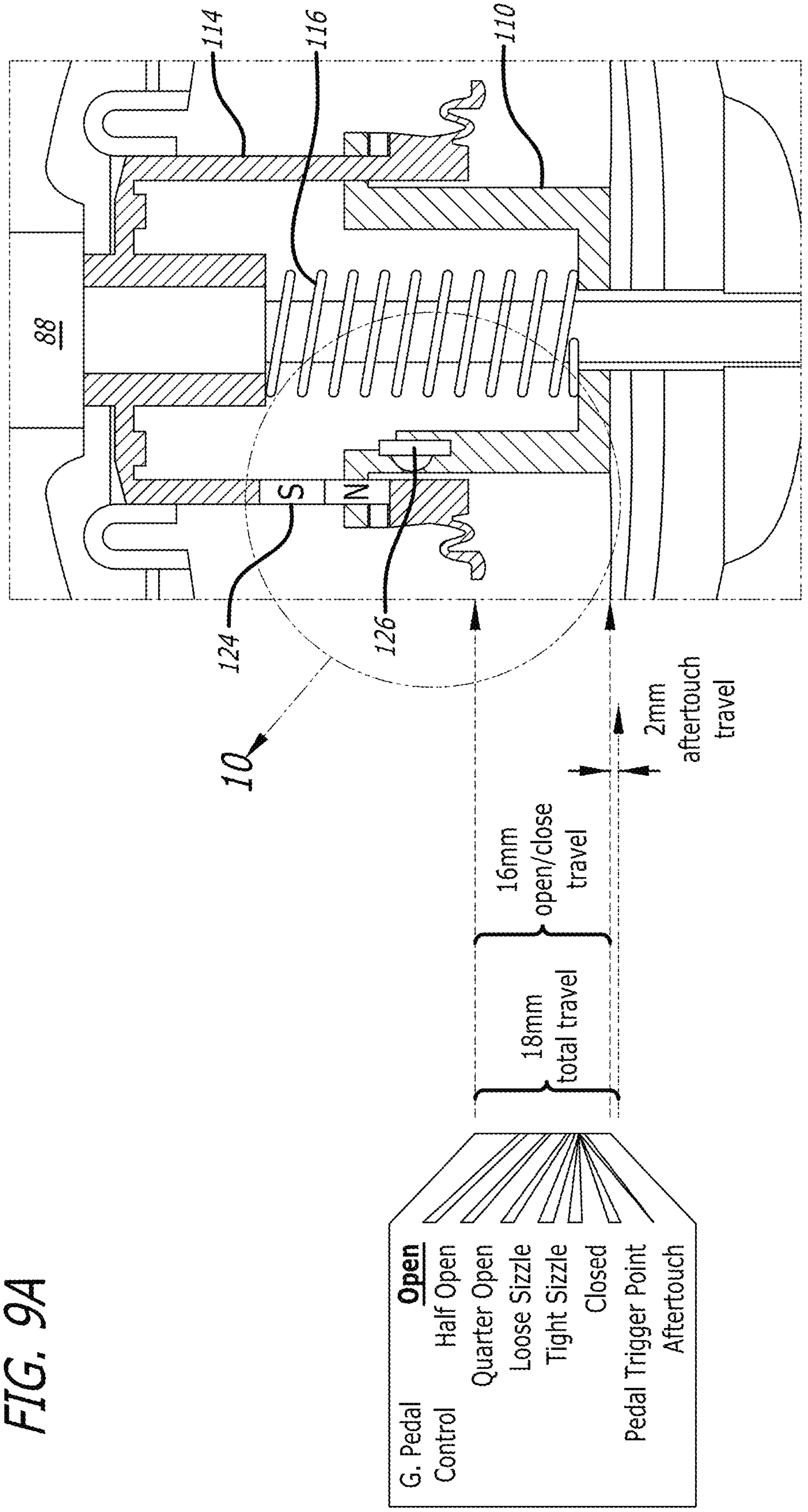
FIGS. 9A-9D are enlargements of the sectional view in FIG. 8 showing different operating positions.

FIGS. 9A-9D are enlargements of the sectional view in FIG. 8 showing different operating positions. FIG. 10 is an enlargement of a lower end of the movable housing 114 of the transducer assembly from FIG. 9A, illustrating a lower elastomeric annular molding or foot 120. The foot 120 is a compressible material which cushions and influences the position of the movable housing 114 when it contacts the stationary rubber buffer 118 directly below it. There also may be a soft annular washer 122 (FIG. 10) made of a compressive material such as rubber placed between flanges of the movable upper housing 114 and the stationary housing 114 to absorb forces and reduce associated noise when the upper cymbal 104 and upper housing 114 are released to move upward under influence of the spring 116.

The annotation in FIG. 9A indicates that there is a first distance of travel between full open and full closed such as 16 mm, but a total second travel distance of 18 mm which takes into account after the foot 120 contacts the stationary rubber buffer 118. There is thus a 2 mm after touch travel. These distances may be altered to create different cymbal actions, and are used as an example here to match the Texas Instruments DRV5056 Hall effect sensor mentioned above.

Figure 9B:
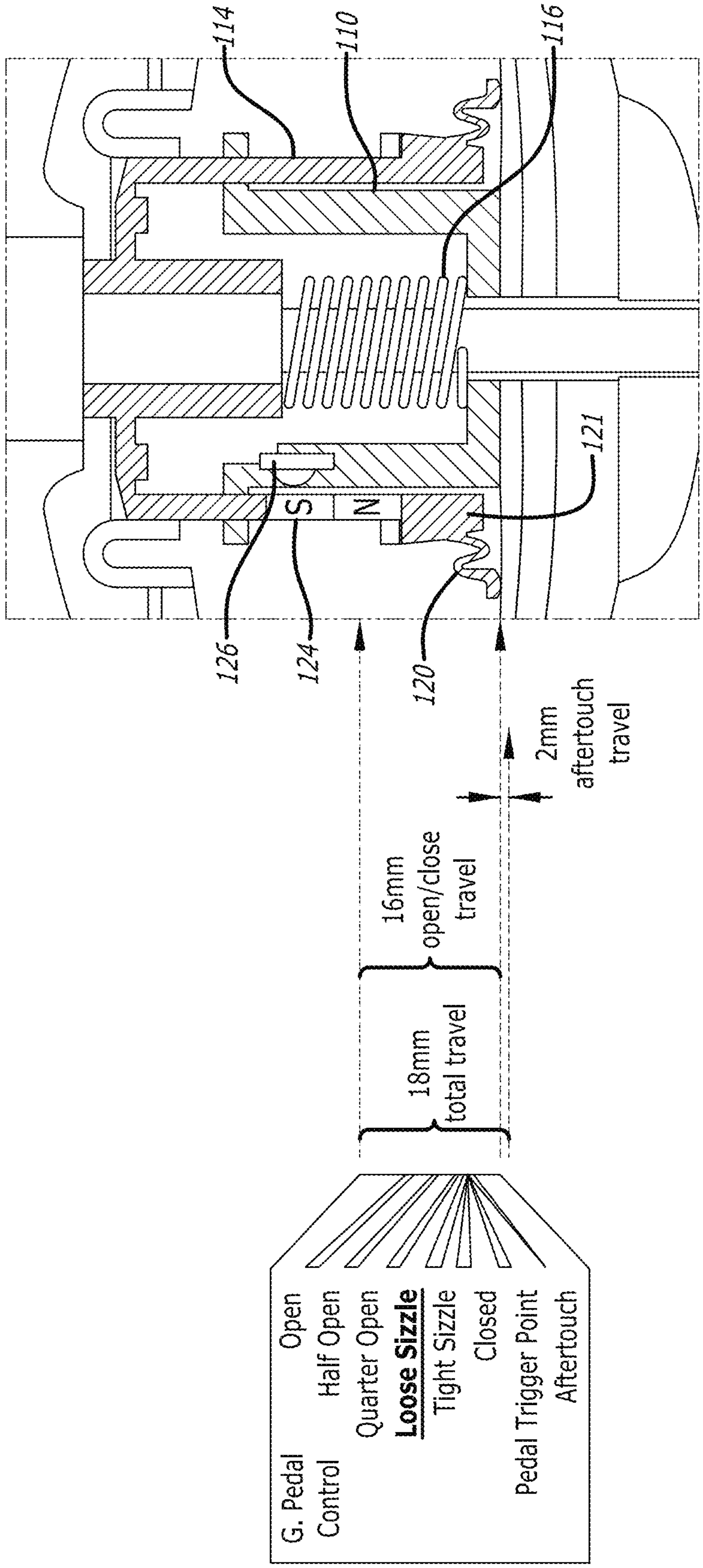
Figure 10:
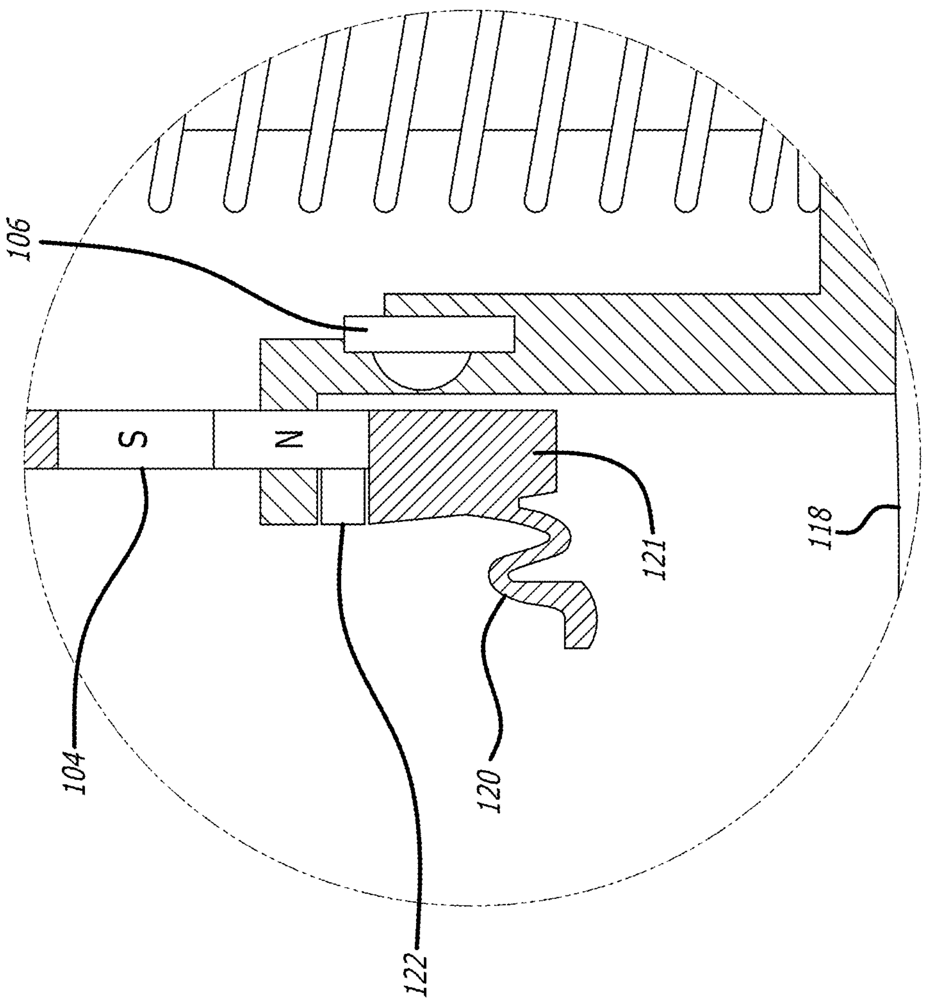
FIG. 10 is an enlargement of a lower end of a movable element of the transducer assembly from FIG. 9A.

In FIG. 9B, the pedal is depressed lightly down to close the hi-hat and create a so-called "loose sizzle." In this position, the outer extent of the foot 120 has come into contact with the buffer 118, but an inner thicker anvil portion 121 of the foot 120 remains slightly elevated above the buffer 118. This position and movement is calibrated into the sensor 126 to create the "loose sizzle" sound.

Figure 9C:
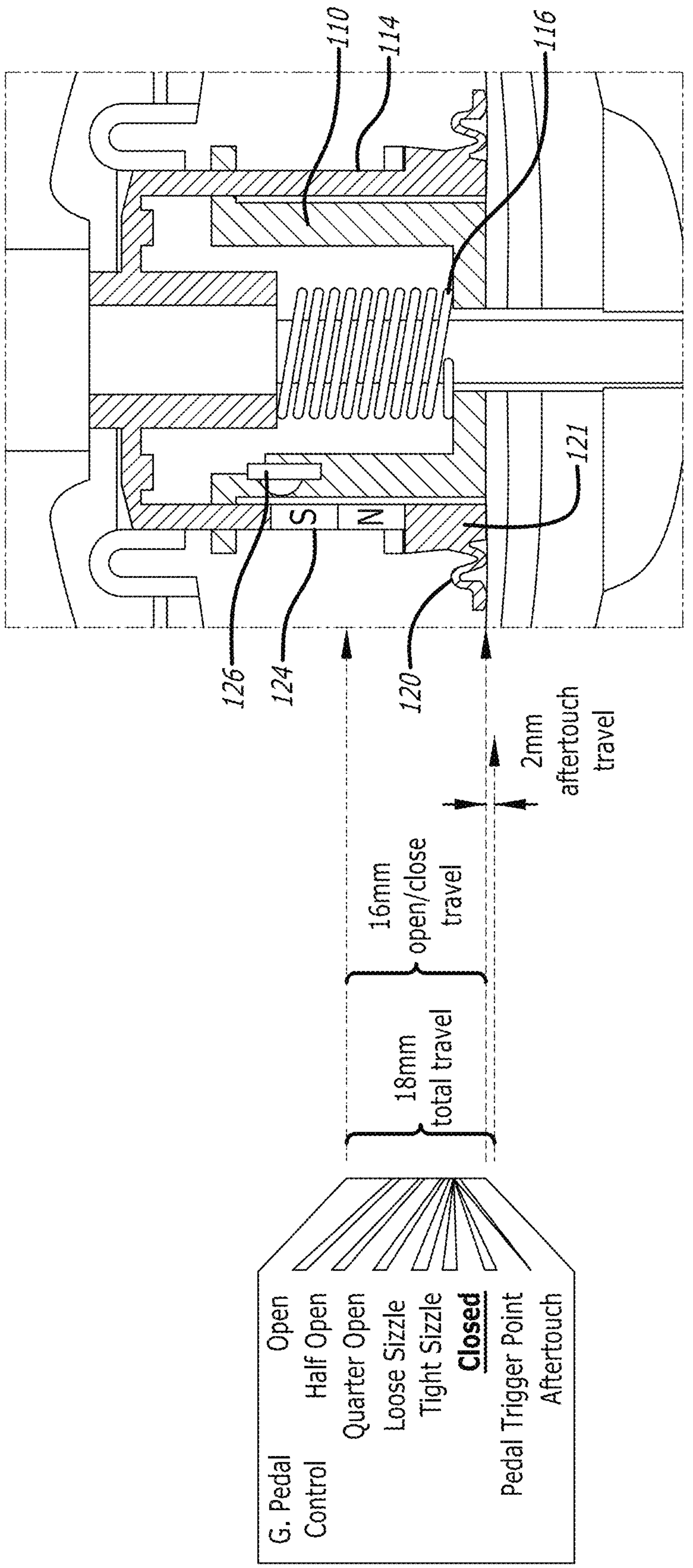

In FIG. 9C, the pedal is depressed firmly down to close the hi-hat. In this position, the outer skirt of the foot 120 flexes such that the inner anvil portion 121 comes into contact with the buffer 118. This position and movement is calibrated into the sensor 126 to create the closed sound of the cymbal assembly 80.

Figure 9D:
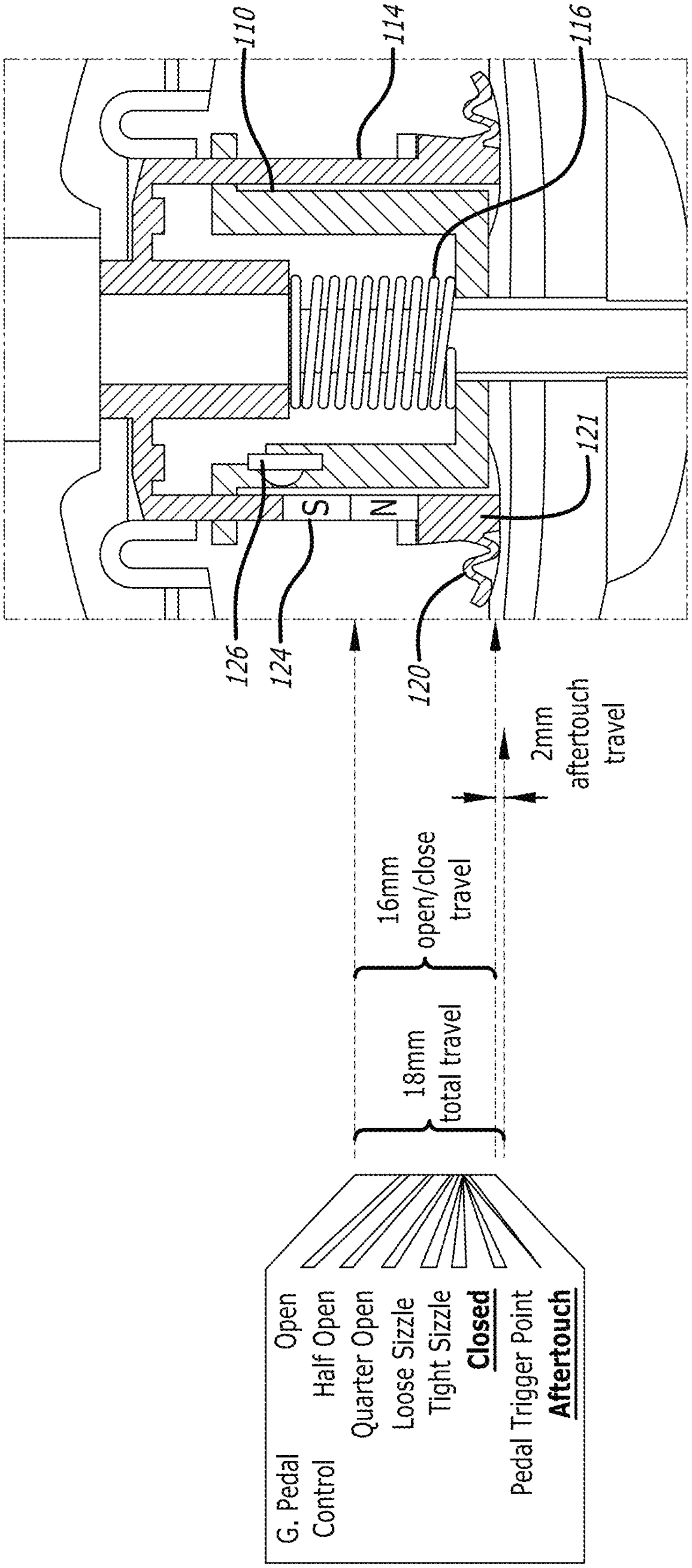

Finally, FIG. 9D shows the pedal after having been depressed down hard to close the hi-hat and push the inner anvil portion 121 of the foot 120 downward into the buffer 118. This is also a closed sound but the sensor 126 is calibrated to generate a slightly higher pitch of sound, such as one semitone up. Each of these positions results in a different cymbal sound.

Figure 11:
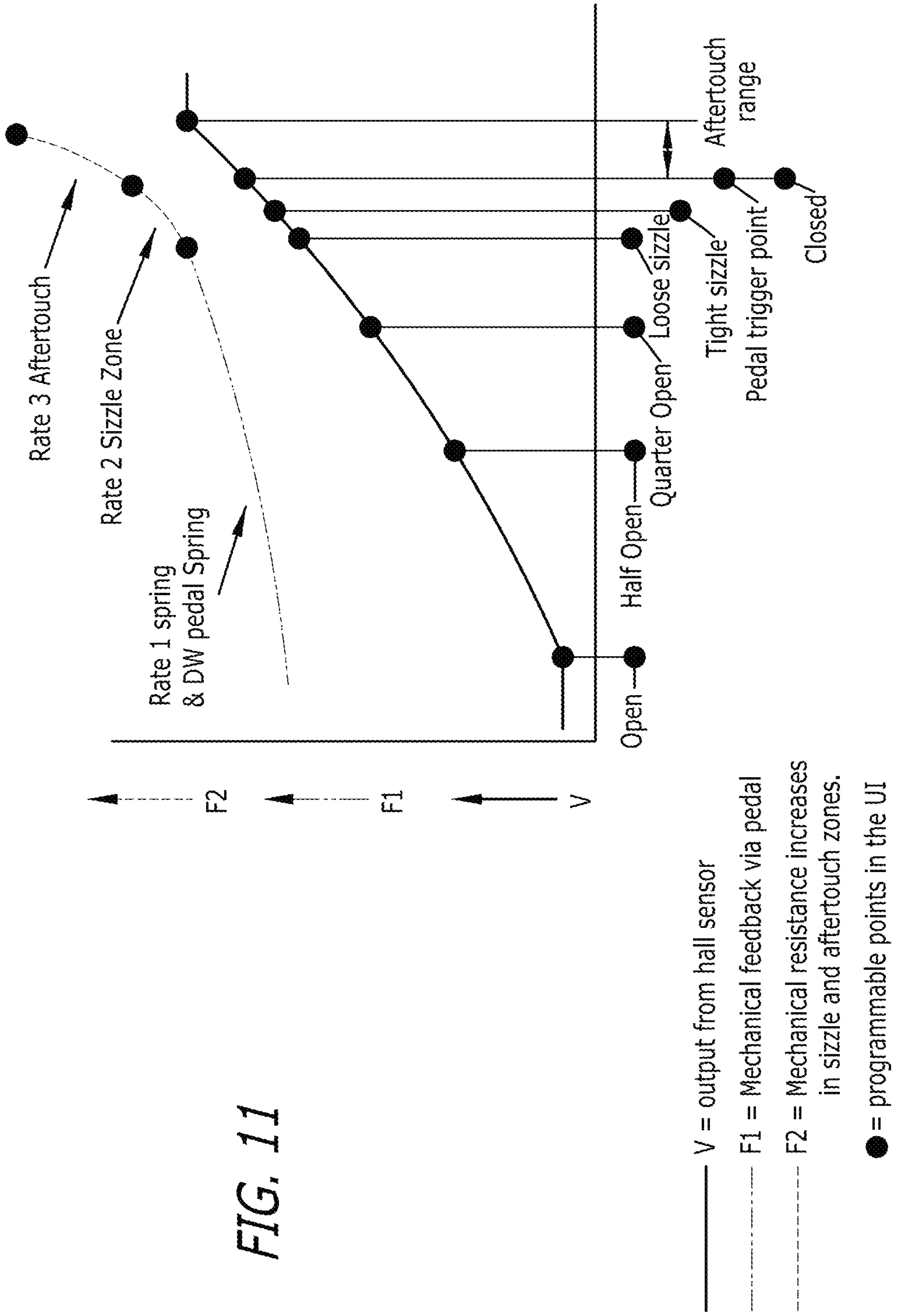
FIG. 11 show curves indicating both force and velocity experienced by the electronic hi-hat cymbal assembly of FIG. 8 graphed against the resulting effects generated by the system.

FIG. 11 show curves indicating both force and velocity experienced by the electronic hi-hat cymbal of FIG. 8 graphed against the resulting effects generated by the system. The distances range from fully open to the left on the X-axis to closed and then farther in the "aftertouch" range, which is after the inner thicker portion of the foot 120 contacts the buffer 118. The solid line curve V indicates the output from the Hall effect sensor 126. The two force curves F1 and F2 correspond to the mechanical feedback exerted on the pedal at different stages of foot depression. An initial force curve F1 is felt during travel from the open to the "loose sizzle" commencement when the outer extent of the foot 120 has come into contact with the buffer 118. Subsequently, the rate of force feedback increases in the second force curve F2 through the sizzle zone and into the aftertouch zone. These zones correspond to flexing of the elastomeric foot 120 and then impact of the inner anvil portion 121 of the foot 120 with the buffer 118 and deformation thereof. Various nodes or points are indicated on the curves to denote the various transitions, which points are calibrated into the software receiving the Hall effect signals to determine the desired sound created.

Figure 12C:
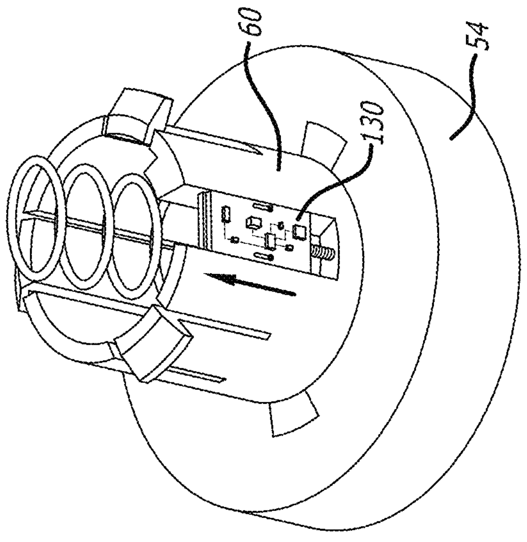
FIGS. 12A-12C are perspective views of a stationary housing of the transducer assembly having a position-adjustable Hall effect sensor thereon.
Figure 12B:
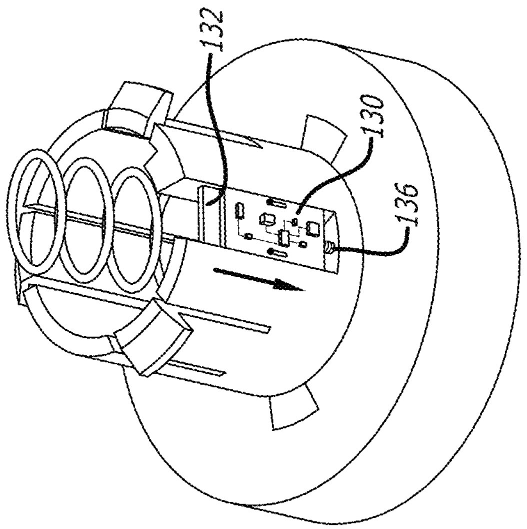
Figure 12A:
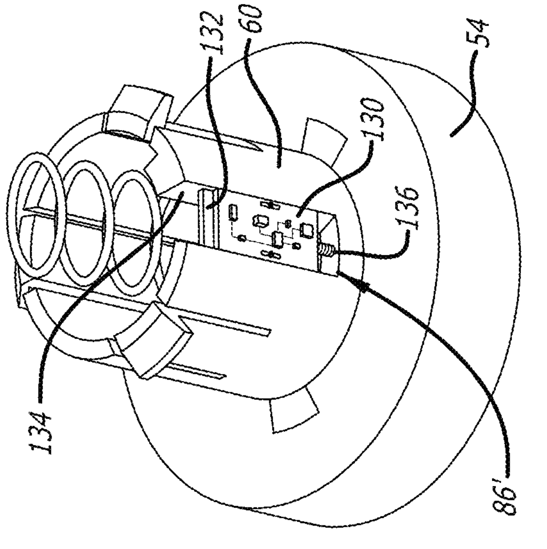

FIGS. 12A-12C are perspective views of a stationary housing of the transducer assembly having a position-adjustable Hall effect sensor 86' thereon. As mentioned above, the Hall effect sensors described herein produce signals which are then processed using software which interprets the relative position of the moving members of the hi-hat assembly. The software can of course be calibrated at the manufacturing stage for the particular physical arrangement. Additionally, the software may possess the ability for the user to adjust the calibration settings for different sound effects. However, it may also be useful to supplement this virtual calibration with a physical calibration means. There is, the "closing point" of the hi-hat cymbal is critical for the correct feel. It is important for the software to recognize the exact point where the mechanical movement of the pedal hits the rubber covered anvil and produce a closing sample sound. Adding a mechanical way of adjusting the vertical position of either the magnet or the Hall effect sensor to adjust the calibration of the closing point is thus contemplated.

In FIGS. 12A-12C the position-adjustable Hall effect sensor 86' comprises a small circuit board 130 as before mounted on a fixed panel 132 within a vertical slot 134 of the stationary housing. A threaded rod 136 is arranged to displace the circuit board 130 up and down relative to the panel 132, preferably by at least a few millimeters. For example, the circuit board 130 and panel 132 may have cooperating vertical rails (not shown). The threaded rod 136 may pass through a similarly threaded bore (not shown) in the circuit board 130 so that rotation of the rod causes vertical movement of the circuit board. The threaded rod 136 may pass downward through the bulkhead 54 to a lower thumbscrew or other actuator (not shown) accessible to the user. FIG. 12B shows the circuit board 130 being displaced downward, while FIG. 12C shows the circuit board displaced upward. Slight adjustments may be made in conjunction with the software calibration to control the desired sound effects.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. An electronic hi-hat cymbal, comprising:

a vertical cymbal stand;

a stationary housing mounted at an upper end of the stand;

a foot pedal mounted to a lower end of the stand configured to be depressed by a user's foot and having a return spring, the foot pedal being connected to a vertical rod that extends up through a bore in the stand to an upper portion positioned above the stationary housing;

a movable housing mounted to the upper portion of the rod wherein vertical movement of the rod causes the movable housing to move adjacent to the stationary housing, and the movable housing moves upward from a down position limited by impact between the movable housing and the stationary housing;

wherein one of the movable housing and stationary housing has a permanent magnet thereon with opposite poles vertically spaced apart and the other of the movable housing and stationary housing has a Hall effect sensor thereon configured to generate an electronic signal, with the magnet and Hall effect sensor being aligned so as to reciprocate vertically alongside each other when the foot pedal is depressed;

a return spring positioned to bias the movable housing upward;

a simulated cymbal mounted to a top end of the rod that moves vertically with the movable housing; and at least one additional electronic positioning sensor that generates an electronic signal upon impact between the movable housing and the stationary housing.

2. The hi-hat cymbal of claim 1, further including a simulated lower cymbal mounted to the stationary housing.

3. The hi-hat cymbal of claim 1, wherein the stationary housing has a tubular main body and the Hall effect sensor is mounted in a sidewall thereof, and the movable housing has a tubular cup that surrounds the tubular main body, wherein the magnet is mounted in a sidewall of the tubular cup radially outward from the Hall effect sensor.

4. The hi-hat cymbal of claim 3, wherein the Hall effect sensor is mounted for manual vertical adjustment relative to the stationary housing.

5. The hi-hat cymbal of claim 3, wherein the stationary housing has a lower bulkhead at a bottom end of and extending radially outward from the tubular main body, and the movable housing has a lower flange at a bottom end of and extending radially outward from the tubular cup, wherein the flange contacts the bulkhead to define the down position of the movable housing.

6. The hi-hat cymbal of claim 5, further including at least one compressible buffer positioned between the flange and the bulkhead to cushion impact therebetween.

7. The hi-hat cymbal of claim 5, wherein the flange comprises a foot formed of a compressible material which cushions the impact between the movable housing and the bulkhead.

8. The hi-hat cymbal of claim 6, wherein the flange comprises a foot formed of a compressible material which cushions the impact between the movable housing and the bulkhead.

9. The hi-hat cymbal of claim 1, wherein the at least one additional electronic positioning sensor is selected from the group consisting of a piezo-electric sensor and a force sensing resistor sensor, and is mounted to an upward facing surface of the stationary housing that the movable housing impacts.

10. An electronic hi-hat cymbal, comprising:

a vertical cymbal stand;

a stationary housing mounted at an upper end of the stand having a tubular main body and a lower bulkhead at a bottom end of and extending radially outward from the tubular main body;

a foot pedal mounted to a lower end of the stand configured to be depressed by a user's foot and having a return spring, the foot pedal being connected to a vertical rod that extends up through a bore in the stand to an upper portion positioned above the stationary housing;

a movable housing mounted to the upper portion of the rod having a lower flange at a bottom end of and extending radially outward from a tubular cup having a downward cavity that surrounds the tubular main body, wherein vertical movement of the rod causes the tubular cup to move adjacent to the tubular main body, and the movable housing moves upward from a down position limited by impact between the movable housing and the stationary housing;

wherein one of the tubular cup and tubular main body has a permanent magnet thereon with opposite poles vertically spaced apart and the other of the tubular cup and tubular main body has a Hall effect sensor thereon configured to generate an electronic signal, with the magnet and Hall effect sensor being aligned so as to reciprocate vertically alongside each other when the foot pedal is depressed;

a return spring positioned to bias the movable housing upward; and a simulated cymbal mounted to a top end of the rod that moves vertically with the movable housing.

11. The hi-hat cymbal of claim 10, further including a simulated lower cymbal mounted to the stationary housing.

12. The hi-hat cymbal of claim 10, wherein the Hall effect sensor is mounted in a sidewall of the tubular main body of the stationary housing, and the magnet is mounted in a sidewall of the tubular cup of the tubular main body radially outward from the Hall effect sensor.

13. The hi-hat cymbal of claim 12, wherein the Hall effect sensor is mounted for manual vertical adjustment relative to the stationary housing.

14. The hi-hat cymbal of claim 10, wherein the stationary housing has a lower bulkhead at a bottom end of and extending radially outward from the tubular main body, and the movable housing has a lower flange at a bottom end of and extending radially outward from the tubular cup, wherein the flange contacts the bulkhead to define the down position of the movable housing.

15. The hi-hat cymbal of claim 14, further including at least one compressible buffer positioned between the flange and the bulkhead to cushion impact therebetween.

16. The hi-hat cymbal of claim 14, wherein the flange comprises a foot formed of a compressible material which cushions the impact between the movable housing and the bulkhead.

17. The hi-hat cymbal of claim 15, wherein the flange comprises a foot formed of a compressible material which cushions the impact between the movable housing and the bulkhead.

18. The hi-hat cymbal of claim 10, further including at least one additional electronic positioning sensor that generates an electronic signal upon impact between the movable housing and the stationary housing.

19. The hi-hat cymbal of claim 18, wherein the at least one additional electronic positioning sensor is selected from the group consisting of a piezo-electric sensor and a force sensing resistor sensor, and is mounted to an upward facing surface of the stationary housing that the movable housing impacts.

20. An electronic hi-hat cymbal, comprising:

a vertical cymbal stand;

a stationary housing mounted at an upper end of the stand;

a foot pedal mounted to a lower end of the stand configured to be depressed by a user's foot and having a return spring, the foot pedal being connected to a vertical rod that extends up through a bore in the stand to an upper portion positioned above the stationary housing;

a movable housing mounted to the upper portion of the rod wherein vertical movement of the rod causes the movable housing to move adjacent to the stationary housing, and the movable housing moves upward from a down position limited by impact between the movable housing and the stationary housing;

wherein one of the movable housing and stationary housing has a permanent magnet thereon with opposite poles vertically spaced apart and the other of the movable housing and stationary housing has a Hall effect sensor thereon configured to generate an electronic signal, with the magnet and Hall effect sensor being aligned so as to reciprocate vertically alongside each other when the foot pedal is depressed;

a return spring positioned to bias the movable housing upward;

a simulated cymbal mounted to a top end of the rod that moves vertically with the movable housing; and a simulated lower cymbal mounted to the stationary housing.

21. An electronic hi-hat cymbal, comprising:

a vertical cymbal stand;

a stationary housing mounted at an upper end of the stand;

a foot pedal mounted to a lower end of the stand configured to be depressed by a user's foot and having a return spring, the foot pedal being connected to a vertical rod that extends up through a bore in the stand to an upper portion positioned above the stationary housing;

a movable housing mounted to the upper portion of the rod wherein vertical movement of the rod causes the movable housing to move adjacent to the stationary housing, and the movable housing moves upward from a down position limited by impact between the movable housing and the stationary housing;

wherein one of the movable housing and stationary housing has a permanent magnet thereon with opposite poles vertically spaced apart and the other of the movable housing and stationary housing has a Hall effect sensor thereon configured to generate an electronic signal, with the magnet and Hall effect sensor being aligned so as to reciprocate vertically alongside each other when the foot pedal is depressed;

wherein the stationary housing has a tubular main body and the Hall effect sensor is mounted in a sidewall thereof, and the movable housing has a tubular cup that surrounds the tubular main body, wherein the magnet is mounted in a sidewall of the tubular cup radially outward from the Hall effect sensor;

a return spring positioned to bias the movable housing upward; and a simulated cymbal mounted to a top end of the rod that moves vertically with the movable housing.

22. The hi-hat cymbal of claim 21, wherein the Hall effect sensor is mounted for manual vertical adjustment relative to the stationary housing.

23. The hi-hat cymbal of claim 21, wherein the stationary housing has a lower bulkhead at a bottom end of and extending radially outward from the tubular main body, and the movable housing has a lower flange at a bottom end of and extending radially outward from the tubular cup, wherein the flange contacts the bulkhead to define the down position of the movable housing.

* * * * *